(12) United States Patent
Moriarty

(10) Patent No.: US 6,668,555 B1
(45) Date of Patent: Dec. 30, 2003

(54) SOLAR RECEIVER-BASED POWER GENERATION SYSTEM

(75) Inventor: Michael P. Moriarty, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/315,485

(22) Filed: Dec. 9, 2002

(51) Int. Cl.[7] ................................. F24J 2/32
(52) U.S. Cl. ................. 60/641.8; 60/641.12; 126/635
(58) Field of Search .................. 60/641.8, 641.12, 60/641.11; 126/635

(56) References Cited

U.S. PATENT DOCUMENTS

| | | | |
|---|---|---|---|
| 4,262,483 A | * 4/1981 | DeGeus | 60/641.8 |
| 4,598,695 A | * 7/1986 | Niggemann | 126/635 |
| 4,947,825 A | * 8/1990 | Moriarty | 126/635 |
| 5,113,659 A | * 5/1992 | Baker et al. | 60/641.8 |
| 6,487,859 B2 | * 12/2002 | Mehos et al. | 60/641.8 |

OTHER PUBLICATIONS

Office of Energy Efficiency and Renewable Energy, Department of Energy, Consumer Energy Information: EREC Reference Briefs; http://www/eren.doe.gov/consumerinfo/rebriefs/ba9.html; "Heat Engines".

Office of Energy Efficiency and Renewable Energy Network (EREN); U.S. Department of Energy, Concentrating Solar Power (CSP) Program; http://www.eren.doe.gov/csp/pdfs/solar_dish.pdf; "Solar Dish Engine".

* cited by examiner

Primary Examiner—Sheldon J. Richter
(74) Attorney, Agent, or Firm—William C. Anderson

(57) ABSTRACT

A solar receiver system (10) has a solar receiver (12) that receives sun rays (14) directed thereto. The receiver (12) has a heat pipe (26) having working fluid (38) therein. The first end (28) of heat pipe (26) and a second end (30) form a respective first condenser (32) and a second condenser (34). An evaporator portion (36) is disposed between the ends (28,30). The first end (28) has an air manifold (42) therearound. The second end has a liquid manifold (48) therearound. The heated air from the air manifold (42) is provided to a power generation device (22). The power generation device (22) receives heated air from the air manifold (42) which is expanded in a turbine (68) to extract mechanical work therefrom. The turbine (68) may be coupled to a generator (78) for generating electrical power in response to the mechanical energy.

21 Claims, 4 Drawing Sheets

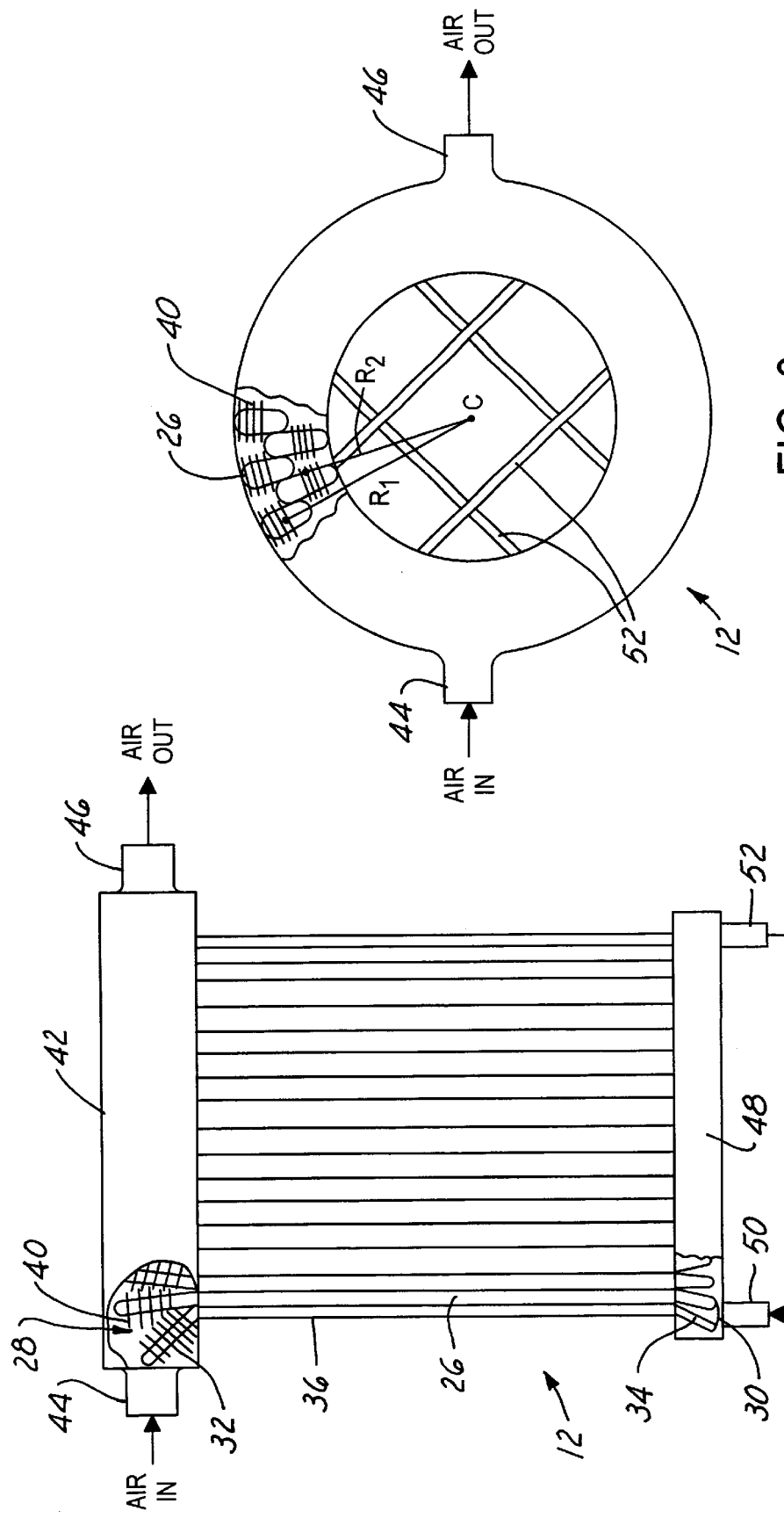

SOLAR RECEIVER-BASED POWER GENERATION SYSTEM

TECHNICAL FIELD

The present invention relates generally to solar energy receiving devices, and more particularly, to a receiving device and heat engine for generating mechanical energy to operate machinery or produce electricity.

BACKGROUND ART

Using solar energy to power various devices is useful in reducing the dependency of the country on fossil fuels. Solar power systems include photovoltaics that generate electricity directly from sunlight and solar power systems that use conventional power cycles and machinery such as Brayton or Rankine. The latter are currently competitive with photovoltaics on a cost per kilowatt basis.

One drawback in the implementation of such devices commercially is the expense associated therewith. The expense, for example, is due to the high costs of materials, and various other complexities involved with such systems. One expensive portion of such systems is a primary heat exchanger. Such a heat exchanger is relatively expensive and increases the cost of the system.

It would therefore be desirable to reduce the cost of a solar power system by simplifying the design and increasing the economy of manufacture and thus the subsequent utilization of such devices.

SUMMARY OF THE INVENTION

The present invention provides an improved solar receiver design that reduces the cost of such devices.

In one aspect of the invention, a solar receiver includes a heat pipe having a working fluid therein. The heat pipe has a first condenser portion disposed at a first end and a second condenser portion disposed at a second end. The heat pipe further includes an evaporator portion disposed between the first end and the second end. An air manifold is coupled to the first end. The air manifold has an air inlet and an air outlet. A liquid manifold is coupled to the second end. The liquid manifold has a liquid inlet and a liquid outlet. The evaporator portion of the heat pipe receives the solar energy which is disposed of at the gas and the liquid cooled ends of the heat pipe.

In a further aspect of the invention, a method for operating a solar receiver includes heating a working fluid in a heat pipe to form heated working fluid, circulating the heated working fluid within the heat pipe, heating air outside the heat pipe to form heated air. The method further includes converting the heated air into mechanical energy, heating liquid outside the heat pipe at a second end to form a heated liquid, and storing thermal energy from the heated liquid. The processes of heating the air and heating of the liquid may be adjusted to occur simultaneously in any proportion by adjusting the flowrates of the gas and the liquid.

One advantage of the invention is that a primary heat exchanger typically used in such systems is eliminated. Further, the use of a minimum inventory liquid loop to supply energy to phase change or other types of thermal energy storage units reduced the overall cost of the system.

Another advantage of the invention is that it may be operated using a thermal storage device to supply energy to the receiver upon the passage of clouds or for pre and post-daylight operation.

Another advantage of the invention is that heat stored in the thermal storage device may be used to activate or start the heat pipe without the use of solar energy incident on the evaporator section of the pipe. This can result in a significant reduction of thermal strain on the heat pipe, thereby significantly increasing heat pipe fatigue life.

Another advantage of the invention is that the Brayton turbomachinery can be preferentially located at the top of the tower where it can be close coupled to the receiver. This results in minimizing the pressure drop between the compressor and expansion stages of the turbine, thus minimizing the impact of gas heater pressure drop on turbine performance.

Other aspects and advantages of the present invention will become apparent upon the following detailed description and appended claims, and upon reference to the accompanying drawings.

BRIEF DESCRIPTION OF THE DRAWINGS

FIG. 2 is a side view of a solar receiver showing the paths traveled by the liquid and gas coolants according to the present invention.

FIG. 3 is a partial cutaway top view of the solar receiver showing the arrangement of the tube ends and fins in the gas cooled end of the heat pipes of FIG. 2.

BEST MODES FOR CARRYING OUT THE INVENTION

Figure 1:
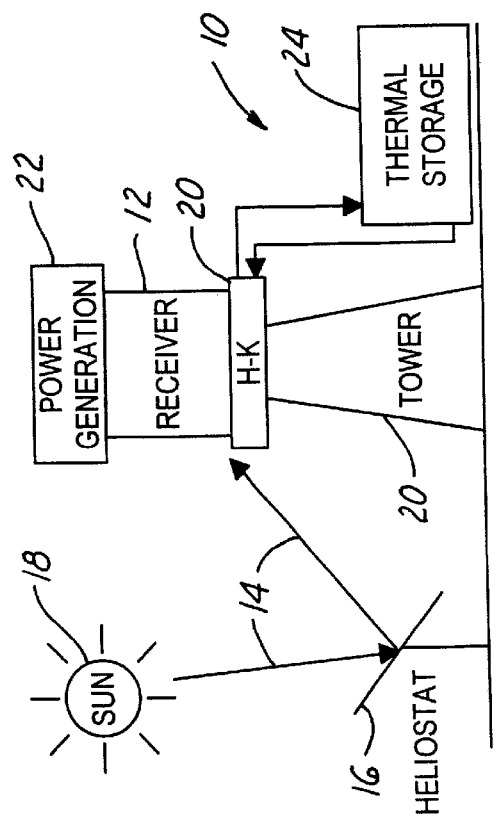
FIG. 1 is a simplified elevational view of a solar receiver system according to the present invention.

In the following figures the same reference numerals will be used to identify the same components. The present invention is illustrated with respect to a Brayton power system. However, those skilled in the art will recognize that the system may be used for other types of power systems including Rankine or Stirling Referring now to FIG. 1, a solar receiver system 10 is illustrated having a solar receiver 12 that receives sun ray 14 reflected from a heliostat 16 from sun 18. Receiver 12 is positioned on top of a tower 20. Thus, several heliostats 20 may be positioned around tower 20 to direct sun rays 14 at receiver 12. The tower 20 may be various heights depending on the particular location and system employed. The receiver 12 is positioned adjacent to a liquid heat transfer device 20 and a power generation device 22. The liquid heat transfer device 20 has thermal storage 24 associated therewith for storing thermal energy from receiver 12 as will be further described below.

Referring now to FIGS. 2 and 3, solar receiver 12 is illustrated in further detail. Solar receiver 12 includes a plurality of heat pipes 26. The heat pipes 26 are arranged generally in parallel and positioned about a cylinder. Thus, in this embodiment the heat pipes form the axially extending wall around the cylinder forming the solar receiver 12. As is illustrated best in FIG. 3, heat pipes may be alternated in two rows having two different radii R1 and R2 from center C.

Heat pipes 26 have first ends 28 and second ends 30. First ends 28 form a first condenser 32 and second end 30 forms a second condenser 34. The area between first end 28 and second end 30 form an evaporator 36 therebetween.

Figure 4:
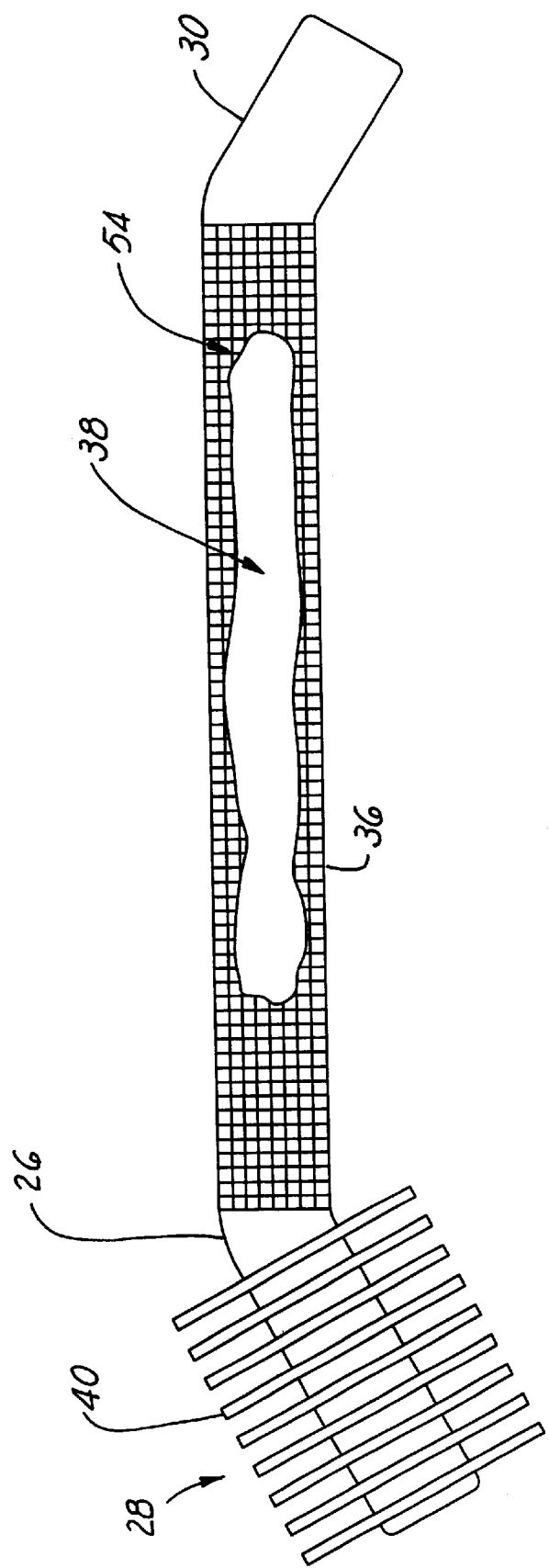
FIG. 4 is a side view of a heat pipe of the solar receiver of FIGS. 2 and 3.

Referring now also to FIG. 4, each heat pipe 26 has each end sealed. The heat pipes are filled with a working fluid 38 that is preferably a liquid metal, although other liquids may be used. Examples of suitable heat pipe working fluids are potassium, sodium and lithium.

First ends 28 and second ends 30 are used for convective heat transfer. To facilitate heat transfer at the first end 28, fins 40 may be formed thereon. The first ends are positioned within an air manifold 42. Thus, heat is transferred from the first end and consequently to the fins 40 and into the air within air manifold 42. Cool air enters the air manifold through an air inlet 44 and leaves the air manifold 42 through air outlet 46. The second ends 30 are preferably positioned within a liquid manifold 48. Liquid manifold 48 has a liquid inlet 50 and liquid outlet 52. Liquid inlet 50 and liquid outlet 52 are fluidically coupled to thermal source 24 illustrated in FIG. 1. Fins such as those shown on ends 28 are generally not required in the liquid portion of the condenser because the heat transfer coefficient in the liquid is generally not controlling as is the gas heat transfer coefficient in the gas cooled condenser at the first end. Thus, each condenser end may be either separately or simultaneously cooled by air or liquid.

As is best shown in FIG. 3, supports 52 are used to make the receiver 12 a rigid structure. Supports 52 strengthen the device and hold its shape.

Referring back to FIG. 4, a thermal coating 54 may be disposed on evaporator portion 36 of heat pipe 26. Thermal coating 54 is used to increase the amount of energy absorbed by and conducted into heat pipe 26.

Figure 5:
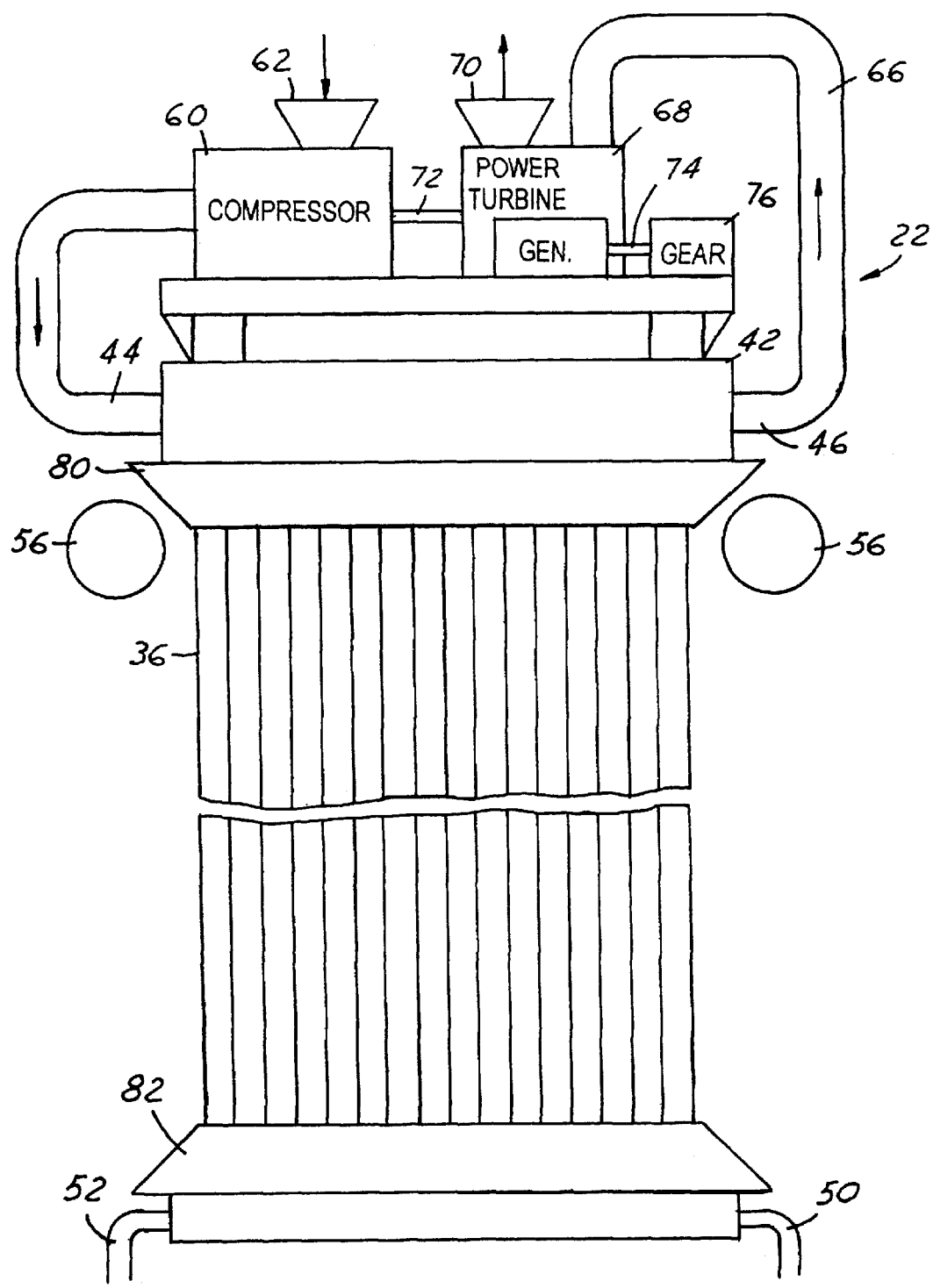
FIG. 5 is a side/block diagrammatic view of a solar receiver according to the present invention.

Referring now to FIG. 5, a deployable radiation shield 56 may be deployably coupled to solar receiver 12. When the temperature drops and solar radiation is no longer heating the heat pipes, it may be desirable to insulate the heat pipes 26 with the radiation shield 56. The radiation shield 56 is thus unrolled to cover the evaporator portion 36 of the heat pipes 26. This may be performed using an electric motor (not shown).

In FIG. 5, power generation device 22 is illustrated in further detail. Power generation device 22 may be positioned on a mounting platform 58 axially above and adjacent to air manifold 42. This helps reduce the overall size of the solar receiver 12. A compressor having a compressor air inlet 62 is used to draw air into the system and route compressed air through a low temperature duct 64 to inlet 44 of air manifold 42. Heated air leaving air manifold 46 is routed through a high temperature duct 66 to a power turbine 68. Power turbine 68 is used to expand the air within duct 66, converting the energy therein into mechanical energy. Low pressure and reduced temperature air is exhausted through turbine air outlet 70. Power turbine 68 has a first shaft 72 and a second shaft 74 which are rotated in response to the expansion of the heated air from high temperature duct 66. The rotation of shaft 72 turns a compressor which in turn compresses the air from compressor air inlet 62. Shaft 74 is coupled to gears 76 which in turn drive a generator 78 to generate electrical energy.

Reflectors 80, 82 may be positioned respectively near first end 28 and second ends 30 of heat pipes 26 to reflect solar energy therefrom.

Figure 6:
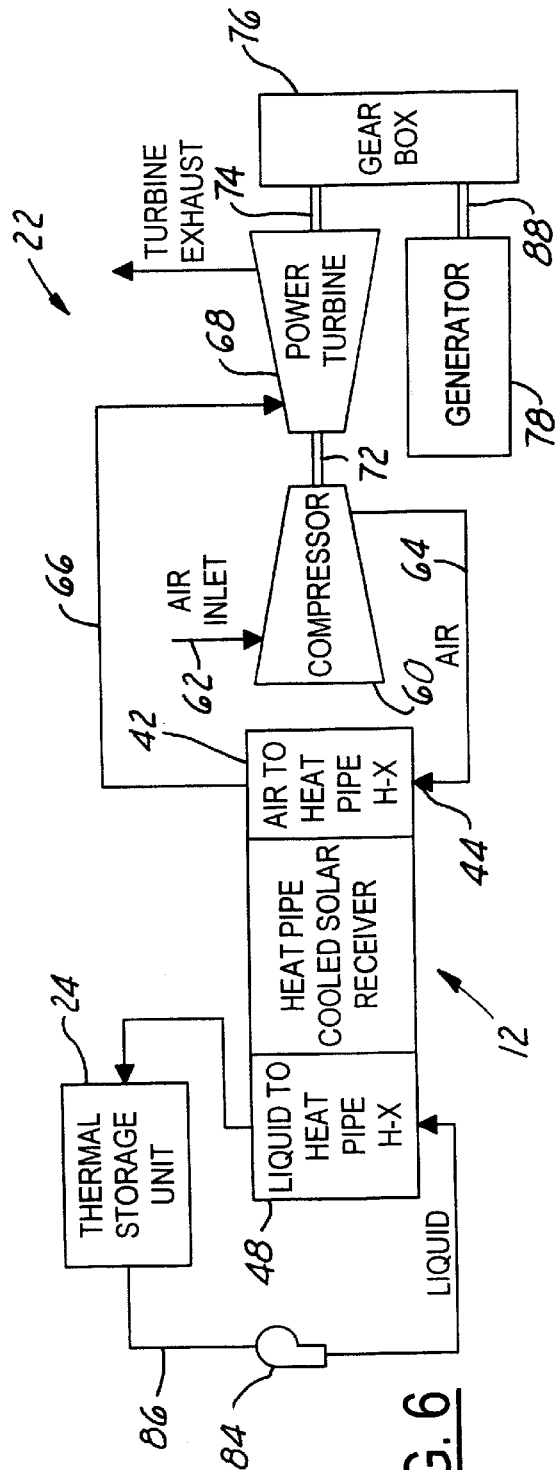
FIG. 6 is a block diagram of the solar collection process used by the solar receiver of FIG. 5.

Referring now to FIG. 6, a schematic view of the solar receiver 12 and power generating device 22 is illustrated in further detail. Liquid manifold 48 is shown thermally coupled to thermal storage unit 24. A valve/pump 84 may be positioned within the fluid lines 86 to control the flow of fluid therethrough.

Compressor air inlet 62 receives ambient air which is directed into compressor 60. Compressed air is routed from compressor 60 through duct 64 to air inlet 44 of air manifold 42. Heated high pressure air from air manifold 42 is routed to power turbine 68 through high temperature and high pressure duct 66. Power turbine expands the air from high temperature and pressure duct 68, rotating shaft 72, 74. Shaft 72 turns compressor 60 to compress inlet air. Power turbine 68 turns output shaft 74 to turn gears within gearbox 76 which in turn rotate a shaft 88 to turn generator 78 to generate electricity. Generator may, for example, generate 60 Hz alternating current.

The operation of the solar receiver may be divided into two temperature operating regions. At a high temperature when the sun is shining and thus sun rays 14 are directed by heliostat 20 to the receiver 12, operates as follows: heated working fluid 38 within the heat pipes 26 heat liquid within liquid manifold 48, the heat from which is stored in thermal storage 24 by the heated liquid transferred to the thermal storage unit. The first condenser heats air within the air manifold 42 which was compressed by compressor 60. The compressed heated air operates power turbine 68 which rotates a shaft to generate mechanical work therefrom. The shaft may be coupled to a generator or other source to generate electric power therefrom.

In a low temperature operation, when the sun is not shining or pre-dawn or post-sunset hours, heated liquid stored in the thermal storage device 24 is transferred to the liquid manifold 48. The heated liquid heats the working fluid 38 at the second end 30. The heat is transferred through the working fluid to the first end 28 which in turns heats air within the air manifold 42. The heated air in air manifold operates the turbine 68 as described above. The valve/pump 84 may be used to provide the liquid from the thermal storage to the liquid manifold 20.

As can be seen, the present invention provides a compact solar receiver.

It should also be noted that although a cylindrical solar receiver is illustrated, the shape of the solar receiver depends on the shape of the solar field. Thus, an elongated rectangular solar receiver in a similar shape to a billboard may also be used.

It should be noted then when operating from the thermal storage 24 when the temperature is low, the radiation shield 56 may be used to prevent heat losses through the heat pipes 26 by insulating them. Thus, when the radiation shields 56 are lowered, they provide an insulating effect for the heat pipes 26.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A solar receiver comprising:
   a heat pipe having a working fluid therein, said heat pipe having a first condenser portion disposed at a first end and a second condenser portion disposed at a second end and an evaporator portion disposed between the first end and the second end;
   an air manifold coupled to said first end, said air manifold having an air inlet and an air outlet; and
   a liquid manifold coupled to said second end, said liquid manifold having a liquid inlet and a liquid outlet.

2. A solar receiver as recited in claim 1 wherein said liquid inlet and liquid outlet are coupled to thermal storage.

3. A solar receiver as recited in claim 1 further comprising a radiation shield deployably coupled to said receiver.

4. A solar receiver as recited in claim 1 further comprising a heliostat directing Sun rays at said heat pipe.

5. A solar receiver as recited in claim 1 wherein the first end comprises fins disposed thereon.

6. A solar receiver as recited in claim 1 wherein said heat pipe comprises a plurality of heat pipes.

7. A solar receiver as recited in claim 6 wherein the plurality of heat pipes are disposed in a cylinder.

8. A solar receiver system comprising:
   a solar receiver comprising,
      a heat pipe having a working fluid therein having a first condenser portion disposed at a first end and a second condenser portion disposed at a second end and an evaporator portion disposed between the first end and the second end;
      an air manifold coupled to said first end, said air manifold having an air inlet and an air outlet; and
      a liquid manifold coupled to said second end, said liquid manifold having a liquid inlet and a liquid outlet;
   thermal storage coupled to said liquid inlet and liquid outlet; and
   an power generation device coupled to said air outlet generate electrical mechanical energy in response to the air from the air outlet.

9. A solar receiver as recited in claim 8 wherein said heat pipe comprises a plurality of heat pipes.

10. A solar receiver as recited in claim 8 wherein said power generation device comprises a Brayton engine.

11. A solar receiver as recited in claim 8 further comprising a heliostat directing sun rays at said heat pipe.

12. A solar receiver as recited in claim 8 wherein said power generation device is disposed longitudinally adjacent to said solar receiver.

13. A solar receiver as recited in claim 8 wherein said power generation device comprises a compressor coupled to said air inlet.

14. A solar receiver as recited in claim 13 further comprising a turbine coupled to said air outlet, said turbine having an output shaft, rotated in response to air in the air outlet.

15. A solar receiver as recited in claim 14 further comprising a generator coupled to said shaft.

16. A solar receiver as recited in claim 15 further comprising a gearbox coupled to said shaft.

17. A method for operating a solar receiver comprises:
   heating a working fluid in a heat pipe to form heated working fluid;
   circulating the heated working fluid within the heat pipe;
   heating air outside the heat pipe to form heated air;
   converting the heated air into mechanical energy;
   heating liquid outside the heat pipe at a second end to form a heated liquid; and
   storing thermal energy from the heated liquid.

18. A method as recited in claim 17 further comprising converting the mechanical energy into electrical energy.

19. A method as recited in claim 17 further comprising when the fluid temperature is greater than a predetermined temperature, performing the steps of heating air outside the heat pipe to form heated air;
   converting the heated air into mechanical energy;
   heating liquid outside the heat pipe at a second end to form a heated liquid;
   storing thermal energy from the heated liquid.

20. A method as recited in claim 17 further comprising when the fluid temperature is less than a predetermined temperature, heating the working fluid with heated liquid from the thermal source.

21. A method as recited in claim 17 further comprising deploying a radiation shield when the fluid temperature is less than a predetermined temperature.

* * * * *